United States Patent [19]

Steen et al.

[11] Patent Number: 4,685,841
[45] Date of Patent: Aug. 11, 1987

[54] RE-ENTRAINMENT AND AIR BLEED DEVICE FOR PNEUMATIC PIPELINE CONVEYING SYSTEMS

[75] Inventors: Wayne R. Steen, McKees Rocks; William J. Aitken, Monongahela, both of Pa.

[73] Assignee: Hanna-Beric Systems, Inc., Cleveland, Ohio

[21] Appl. No.: 843,027

[22] Filed: Mar. 24, 1986

[51] Int. Cl.[4] ............................................. B65G 53/58
[52] U.S. Cl. ...................................... 406/84; 406/94; 406/191
[58] Field of Search .................. 406/83, 84, 93, 94, 406/95, 191, 193, 195

[56] References Cited

U.S. PATENT DOCUMENTS

| | | | |
|---|---|---|---|
| 1,597,438 | 8/1926 | Ennis | 406/191 X |
| 2,684,868 | 7/1954 | Berg | 406/195 |
| 2,699,970 | 1/1955 | Closs | 406/191 X |
| 3,326,496 | 6/1967 | Auberson | 406/93 |
| 3,337,273 | 8/1967 | Farnworth | 406/195 |
| 3,438,337 | 4/1969 | Edwards | 406/192 |
| 3,638,839 | 2/1972 | Weightman | 406/93 |
| 3,924,899 | 12/1975 | Salete | 406/192 |
| 4,130,300 | 12/1978 | Sheridan | 285/16 |
| 4,199,281 | 4/1980 | Wolf | 406/93 |

FOREIGN PATENT DOCUMENTS

| | | | |
|---|---|---|---|
| 3123961 | 1/1983 | Fed. Rep. of Germany | 406/191 |
| 558832 | 9/1977 | U.S.S.R. | 406/193 |

*Primary Examiner*—Jeffrey V. Nase
*Attorney, Agent, or Firm*—Renner, Otto, Boisselle & Lyon

[57] ABSTRACT

Pneumatic pipeline conveying system includes a bleed valve for bleeding conveying gas into or out of a pipeline conduit. Such bleed valve is located at one or more strategic locations along the pipeline conduit where a degree of gas/material separation occurs in the conduit such as at bends and in long horizontal runs where a re-entrainment device is employed to re-entrain particulate material into the conveying gas within the pipeline.

9 Claims, 6 Drawing Figures

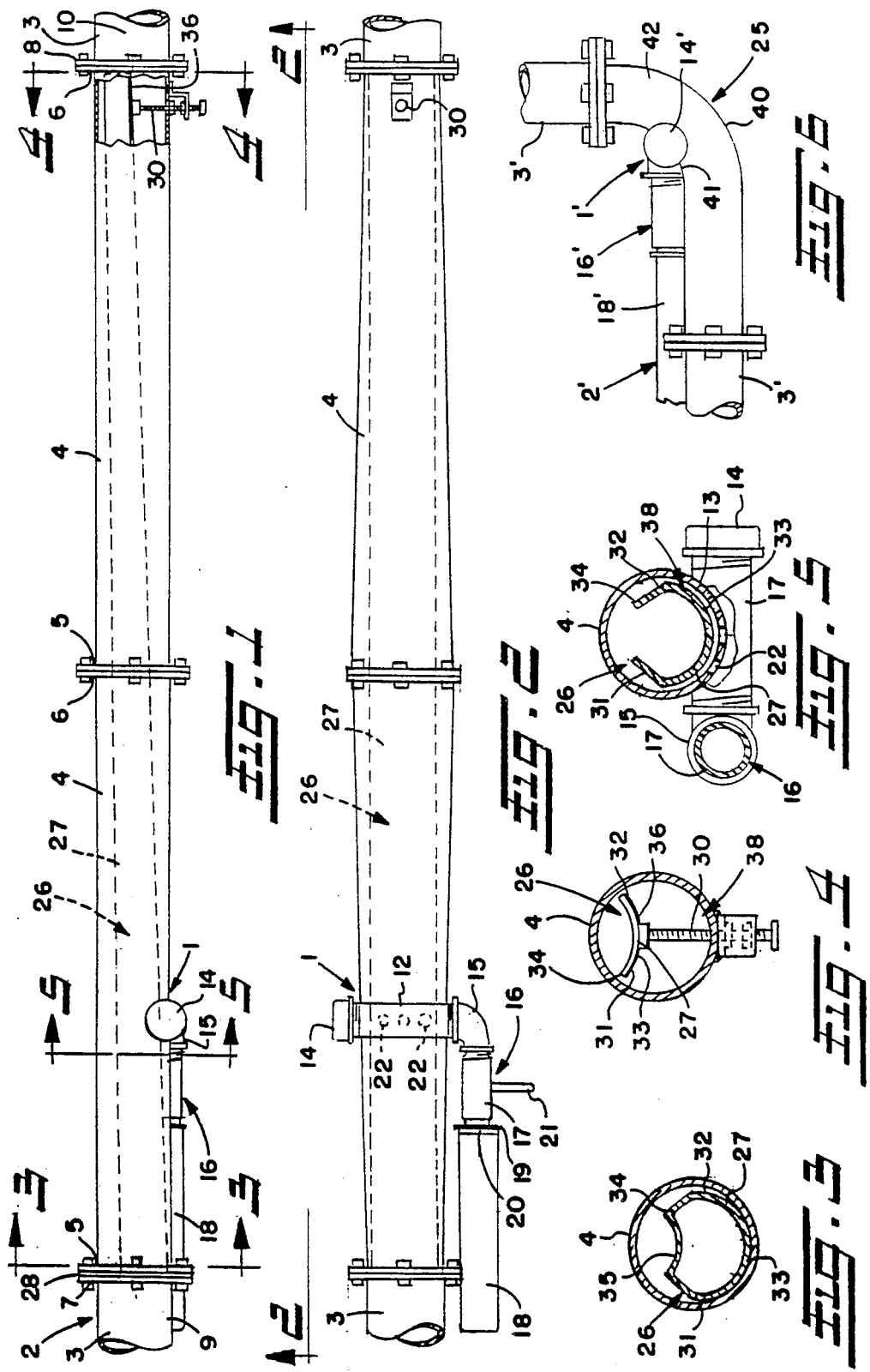

RE-ENTRAINMENT AND AIR BLEED DEVICE FOR PNEUMATIC PIPELINE CONVEYING SYSTEMS

BACKGROUND OF THE INVENTION

This invention relates generally as indicated to a re-entrainment and air bleed device for pneumatic pipeline conveying systems, and more particularly to a device for maintaining substantially constant the required velocity of the gas conveying medium used to transport the particulate material through the pipeline.

Pneumatic conveying of particulate material through a pipeline requires the creation of a differential pressure in the pipeline to produce a gas flow of the required velocity to transport a particular particulate material. The term "particulate material" as used herein is intended to include any material that can be moved by a gas medium through a pipeline including powders as well as granular and rock-like materials.

The flow of gas past the particulate material imparts the necessary movement energy to each particle with a corresponding drop in gas pressure. The velocity of the gas and particulate material in a constant flow area pipeline (conduit) is therefore constantly increasing as pressure is consumed in conveying the material through the conduit. This velocity change can be substantial in systems with a large total differential pressure. For example, in a system having a differential pressure of 18 pounds per square inch pressure (psid) the exit gas velocity at standard ambient conditions is approximately 1.85 times larger than the initial or pick-up velocity where the material is introduced into the conduit, and in a 40 psid system, the exit gas velocity is approximately 2.75 times larger.

Such increases in velocity of the conveying gas along the conduit beyond the required conveying velocity greatly reduces the distance that such material can be conveyed for a given differential pressure, material throughput, and conduit size. Likewise, the material throughput for a given differential pressure, conveying distance and conduit size is substantially reduced, and the rate of wear caused by the material passing through the conduit is substantially increased.

SUMMARY OF THE INVENTION

With the foregoing in mind, it is a principal object of this invention to substantially maintain the required conveying velocity along the conduit of a pneumatic pipeline conveying system by removing gas from the conduit in pressure systems and adding gas in vacuum systems at strategic locations along the conduit.

These and other objects of the present invention may be achieved by providing the pneumatic conveying system with an air bleed device for removing gas from the conduit in pressure systems and for adding gas in vacuum systems at strategic locations along the conduit to substantially maintain the required velocity for conveying the particulate material through the pipeline. Removal of gas in a pressure system requires a gas/material separation in the conduit. Such gas removal may be done at locations where a degree of natural separation occurs in the conduit such as at bends and in long horizontal runs where a re-entrainment device is employed to re-entrain particulate material into the conveying gas within the pipeline.

Maintaining the required conveying velocity along the conduit in such a pneumatic pipeline conveying system has the advantage that the conveying distance for a given differential pressure, material throughput, and pipeline size can be increased. If the required velocity can be substantially maintained throughout the entire conduit, its length for the given conditions can approach twice that of a standard non-bleed pneumatic pipeline conveying system. Likewise, the material throughput for a given differential pressure, conveying distance, and pipeline size can be nearly doubled, and the wear within the pipeline can be decreased by as much as 75% if the required velocity is substantially maintained.

To the accomplishment of the foregoing and related ends, the invention, then, comprises the features hereinafter fully described and particularly pointed out in the claims, the following description and accompanying drawings setting forth in detail certain illustrative embodiments of the invention, these being indicative, however, of but a few of the various ways in which the principles of the invention may be employed.

BRIEF DESCRIPTION OF THE DRAWINGS

In the annexed drawings:

FIG. 1 is a schematic side elevation view of a preferred form of re-entrainment and air bleed device in accordance with this invention included within a pneumatic pipeline conveying system;

FIG. 2 is a schematic bottom plan view of the re-entrainment and air bleed device of FIG. 1;

FIG. 3 is an enlarged transverse section through the inlet end to the re-entrainment and air bleed device of FIG. 1 taken generally along the plane of the line 3—3 thereof;

FIG. 4 is an enlarged end elevation view of the outlet end of the re-entrainment and air bleed device of FIG. 1 as seen from the plane of the line 4—4 thereof;

FIG. 5 is an enlarged transverse section through the re-entrainment and air bleed device of FIG. 1, taken generally along the plane of the line 5—5 thereof; and FIG. 6 is a schematic side elevation view of the air bleed device located at a bend in the pneumatic pipeline conveying system.

DETAILED DESCRIPTION OF THE PREFERRED EMBODIMENTS

Referring now in detail to the drawings, and initially to FIGS. 1 and 2, a preferred form of air bleed device 1 in accordance with this invention is shown inserted in a pneumatic pipeline conveying system 2 of conventional type. Although only one such air bleed device 1 is shown, it should be understood that any number of such air bleed devices may be strategically located along the pipeline conduit 3 to substantially maintain the required conveying velocity of the air conveying medium along the conduit by removing a portion of the gas from the pipeline in pressure systems and by adding gas in vacuum systems at such strategic locations.

Without such gas removal in pressure systems and gas additions in vacuum systems, the velocity of the gas and particulate material in such constant flow area pipeline will constantly increase as the pressure within the pipeline is consumed in conveying the material through the pipeline. By maintaining the required conveying velocity along the pipeline, the conveying distance for a given differential pressure, material throughput, and pipeline conduit size can be substantially increased. Likewise, the material throughput for a given differential pressure, conveying distance, and pipeline conduit size can be substantially increased, and the wear within the pipeline can be substantially reduced if the required velocity is substantially maintained.

Each air bleed device 1 is desirably mounted within a separate conduit section 4 which may have end flanges 5, 6 on opposite ends thereof for connection to correspondingly shaped flanges 7, 8 on pipeline conduit end sections 9, 10. A suitable gasket pack may be inserted between the flanges to prevent leakage.

In the preferred form of air bleed device shown herein, such device 1 includes a pipe section 12 extending transversely of a conduit section 4. The pipe section 12 may include an annular cut-out portion 13 which matches the exterior shape of the conduit section 4 for seating of the pipe section against the conduit section as shown in FIG. 5. The pipe section may be closed at one end by a pipe cap 14, and may have a 90° reducer elbow 15 on the other end for connection of a bleed valve 16 thereto so that the bleed valve housing 17 preferably extends in a direction generally parallel to the conduit section 4 and in closely spaced relation thereto. A filter bag 18 may be attached to the outer end of the bleed valve housing 17 as by means of a bag adapter 19 and bag clamp 20;. Controlled opening and closing of the bleed valve 16 may be achieved by actuation of a valve lever 21 extending radially outwardly from the bleed valve housing 17. Suitable holes 22 in the exterior of the conduit section 4 (see FIGS. 2 and 5) provide fluid communication between the conduit section and pipe section 12.

When a vacuum system is used to convey the particulate material within the pipeline 3, additional gas may be added to the vacuum system in controlled amounts by appropriately setting the bleed valve 16. The additional gas passes through the filter bag 18 and bleed valve 16 into the system through the holes 22 in the conduit section 4. Conversely, when a pressure system is used to convey the particulate material in the pipeline, the air bleed device 16 may be used to remove controlled amounts of gas from the pipeline, the air passing from the pipeline through the holes 22 in the conduit section and out through the bleed valve for discharge therefrom through the filter bag 18.

The removal of gas from a pressure system necessitates locating the air bleed device 1 at a gas/material separation in the pipeline 3 to ensure that the particulate material does not interfere with such gas removal. The air bleed device 1 may, for example, be located at locations where a degree of natural separation has occurred in the pipeline 3' such as at a bend 25 in the pipeline as shown in FIG. 6 or in long horizontal runs where a reentrainment device is required to re-entrain the particulate material into the conveying gas within the pipeline. One such re-entrainment device 26 is shown in FIGS. 1-5 and includes a deflector 27 mounted in and extending longitudinally of one or more conduit sections 4, two such conduit sections 4 being shown in FIGS. 1 and 2. The entrance end to the deflector 27 may be connected to the entrance end of the first (upstream) conduit section 4 in any convenient manner, for example, by providing a mounting flange 28 at the entrance end to the deflector which is secured between the pipeline flange 7 and conduit section flange 5 at the entrance to the conduit section. The cross-sectional area of the deflector 27 is smaller than the inner cross-sectional area of each conduit section 4, and such deflector is held in spaced relationship to the surrounding wall of the conduit sections as by means of an exteriorly mounted screw threaded rod 30 extending through a conduit section and into supporting engagement with the exit end of the deflector. Rotation of the screw threaded rod 30 in opposite directions will result in a lowering or raising of such exit end to adjust the location of the exit end within the conduit section. Additional adjustable supports may be provided along the length of the deflector as desired.

The deflector includes side walls 31, 32 and a bottom wall 33 which is inclined upwardly from the bottom of the inlet end to the first conduit section 4 to approximately the axial center of the outlet end of the last conduit section 4. The top 34 of the deflector is spaced below the inner wall of the conduit sections 4 and may be closed adjacent the entrance end 35 thereof as shown in FIG. 3, but is open over a major portion of the length thereof, all the way to the exit end 36 as shown in FIG. 4. Also, suitable spacing is provided between the deflector 27 and surrounding wall of the associated conduit sections 4 to provide an annular space 38 therebetween over substantially the entire length of the deflector. Since the cross-sectional area of the deflector is less than that of the conduit sections 4, the particle conveying gas entering the deflector expands and spills over the top edges and sidewalls of the deflector and into the annular space 38 while still traveling generally in the axial direction of the conduit sections. It is this annular space 38 that the vent holes 12 in the conduit section 4 communicate with below the deflector 27 to provide for the removal of a portion of the gas from the pipeline without interference by the particulate material which is then being conveyed along the deflector. The remaining portion of the gas still travels generally in the axial direction of the conduit sections 4, and completely surrounds the deflector 27 at the exit end so that the particulate material is discharged centrally of the moving gas to completely entrain the particulate material in the gas by the time the material leaves the re-entrainment device 26.

Where there is a bend 25 in the pipeline 2' as shown in FIG. 6, the gravitational force of the particulate material flowing around the bend will cause the material to move generally outwardly against the radial outermost wall 40 of the bend. In that case, the air bleed device 1' can be made to communicate with the radial inner wall 41 of a conduit section 42 opposite the outermost bend through suitable holes similar to the holes 22 previously described. Otherwise, the details of construction and operation of the air bleed device 1' of FIG. 6 are the same as those shown in FIGS. 1 and 2, and accordingly the same reference numerals followed by a prime symbol are used to designate like parts.

From the foregoing, it will now be apparent that the device of the present invention provides a simple and effective means for maintaining the required velocity of the gas conveying medium within a pipeline substantially constant by removing a portion of the gas in a pressure system and adding additional gas in a vacuum system at strategic locations along the pipeline conduit.

Although the invention has been shown and described with respect to certain preferred embodiments, it is obvious that equivalent alterations and modifications will occur to others skilled in the art upon the reading and understanding of the specification. The present invention includes all such equivalent alterations and modifications, and is limited only by the scope of the claims.

What is claimed is:

1. A pneumatic pipeline conveying system for pneumatically conveying particulate material through a pipeline comprising a pipeline conduit in which a gas flow is produced to transport the particulate material therewithin, and control means for maintaining the velocity of the gas within said pipeline conduit substantially constant, said control means comprising bleed valve means for bleeding gas into or out of said pipeline conduit in controlled amounts at plural locations along the length of said pipeline conduit to maintain the velocity of such gas substantially constant throughout the length of said pipeline conduit, said pipeline conduit including separation means providing for the separation of the particulate material and gas at such plural locations along the length of said pipeline conduit, said bleed valve means being in communication only with the gas that has separated from the particulate material at such plural locations.

2. The system of claim 1 wherein at least one of said separation means is formed by a bend in said pipeline conduit, said bleed valve means communicating with the interior of said pipeline conduit at a radial inner side of said bend.

3. The system of claim 1 wherein at least one of said separation means comprises re-entrainment means within said pipeline conduit for re-entraining the particulate material into the conveying gas within said pipeline conduit, said re-entrainment means including an upwardly inclined deflector within said pipeline conduit for directing the particulate material moving through said pipeline conduit toward the axial center of said pipeline conduit, said deflector being in spaced relation within said pipeline conduit over at least a portion of the length thereof to define an annular space within said conduit surrounding said deflector, said deflector having an open top portion providing fluid communication between the interior of said deflector and said annular space, said bleed valve means communicating with said annular space beneath said deflector.

4. The system of claim 1 wherein said bleed valve means includes a pipe section in fluid communication with the interior of said conduit at each such location, and a bleed valve connected to each said pipe section for bleeding gas into or out of said pipeline conduit at each such location in controlled amounts to maintain the velocity of such gas substantially constant throughout the length of said pipeline conduit.

5. The system of claim 4 further comprising an external valve lever on each said bleed valve for controlled opening and closing of said bleed valve to maintain the velocity of such gas substantially constant throughout the length of said pipeline conduit.

6. The system of claim 4 wherein each said bleed valve has an external gas port to which a filter bag is attached.

7. The system of claim 4 wherein each said pipe section extends generally transversely of said pipeline conduit, each said pipe section having a cut-out portion which matches the exterior shape of said pipeline conduit, and said pipeline conduit has radial holes therein communicating with the interior of each said pipe section through said cut-out portion.

8. The system of claim 7 wherein each said pipe section has ends which extend transversely beyond opposite sides of said pipeline conduit, and each said bleed valve is connected to one end of each said pipe section by a 90° elbow, whereby each said bleed valve extends in a direction generally parallel to the adjacent exterior surface of said pipeline conduit.

9. The system of claim 8 further comprising a pipe cap closing the other end of each said pipe section.

* * * * *